US011230008B2

(12) United States Patent
Schweigler

(10) Patent No.: US 11,230,008 B2
(45) Date of Patent: Jan. 25, 2022

(54) OPTIMISATION METHOD FOR A COATING ROBOT AND CORRESPONDING COATING SYSTEM

(71) Applicant: Dürr Systems AG, Bietigheim-Bissingen (DE)

(72) Inventor: Sven Schweigler, Asperg (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 241 days.

(21) Appl. No.: 16/330,187

(22) PCT Filed: Sep. 4, 2017

(86) PCT No.: PCT/EP2017/072087
§ 371 (c)(1),
(2) Date: Mar. 4, 2019

(87) PCT Pub. No.: WO2018/046434
PCT Pub. Date: Mar. 15, 2018

(65) Prior Publication Data
US 2019/0217473 A1    Jul. 18, 2019

(30) Foreign Application Priority Data
Sep. 9, 2016 (DE) ............... 10 2016 010 945.9

(51) Int. Cl.
*B25J 9/16* (2006.01)
*B25J 11/00* (2006.01)

(52) U.S. Cl.
CPC ......... *B25J 9/1676* (2013.01); *B25J 11/0075* (2013.01); *G05B 2219/45013* (2013.01); *G05B 2219/50391* (2013.01)

(58) Field of Classification Search
CPC ......... B25J 9/1676; G05B 2219/45013; G05B 2219/50391
See application file for complete search history.

(56) References Cited

U.S. PATENT DOCUMENTS

2011/0087375 A1   4/2011   Aurnhammer et al.
2014/0031982 A1*  1/2014   Yamada ............... B25J 9/1676
                                              700/255
(Continued)

FOREIGN PATENT DOCUMENTS

CN   102126219 A   7/2011
CN   103009389 A   4/2013
(Continued)

OTHER PUBLICATIONS

Deng et al., Kinematic Optimization of Robot Trajectories for Thermal Spray Coating Application, Dec. 2014, Journal of Thermal Spray Technology, vol. 23, p. 1382-1389 (Year: 2014).*
(Continued)

*Primary Examiner* — Khoi H Tran
*Assistant Examiner* — Nhi Q Bui
(74) *Attorney, Agent, or Firm* — Bejin Bieneman PLC

(57) ABSTRACT

The disclosure relates to an optimisation method for calculating an optimised movement path of a coating robot (1), including the following steps:
  defining consecutive path points of the movement path using path point data, wherein the path point data defines the spatial position and orientation of the application device (7) at each path point; calculating possible robot configurations for the individual path points of the movement path, wherein each robot configuration includes all axial positions of all robot axes (A1-A7) and at least some of the path points can be reached optionally via multiple different robot configurations;
  calculating a path point-related and preferable also sequence-related quality value individually for the different possible robot configurations of the individual path points, such that each robot configuration is assigned a respective quality value; and—selecting one
(Continued)

of the possible robot configurations for the individual path points according to the quality value of the different possible robot configurations. The disclosure also comprises a corresponding coating system.

14 Claims, 6 Drawing Sheets

(56) References Cited

U.S. PATENT DOCUMENTS

| | | | | |
|---|---|---|---|---|
| 2016/0195390 | A1* | 7/2016 | Nissen | B25J 9/1676 702/155 |
| 2016/0314621 | A1* | 10/2016 | Hill | G06T 7/73 |

FOREIGN PATENT DOCUMENTS

| | | | | |
|---|---|---|---|---|
| CN | 103235513 | A | 8/2013 | |
| CN | 103646171 | A | 3/2014 | |
| CN | 104363850 | A | 2/2015 | |
| CN | 104392081 | A | 3/2015 | |
| CN | 105690410 | A | 6/2016 | |
| DE | 102007061323 | A1 | 7/2009 | |
| DE | 202014010055 | U1 * | 3/2016 | B25J 9/1676 |
| EP | 1332841 | A2 | 8/2003 | |
| EP | 2072195 | A1 | 6/2009 | |
| EP | 2315093 | A1 | 4/2011 | |
| JP | 2000015593 | A | 1/2000 | |
| JP | 2007000954 | A | 1/2007 | |
| JP | 2012196715 | A | 10/2012 | |
| JP | 2014524359 | A | 9/2014 | |

OTHER PUBLICATIONS

Laureen et al., Kinematical soothing of rotary axis near singularity point, 12th International conference on High Speed Machining, Oct. 2015, Nanjing, China, pp. 501-508 (Year: 2015).*

International Search Report and Written Opinion for PCT/EP2017/072087 dated Nov. 23, 2017 (15 pages; with English translation).

Deng, Sihao et al; "Kinematic Optimization of Robot Trajectories for Thermal Spray Coating Application"; Journal of Thermal Spray Technology, ASM International, Materials Park, US, vol. 23, No. 8, Aug. 12, 2014, pp. 1382-1389, XP035375827, ISSN: 1059-9630, DOI: 10.1007/S11666-014-0137-7 [retrieved on Aug. 12, 2014] the whole document.

Hyotyniemi H: "Locally Controlled Optimization of Spray Painting Robot Trajectories", 19900820; 19900820-19900822, vol. 1, Aug. 20, 1990, pp. 283-287, XP010278360, the whole document.

Heping Chen et al; "Automated robot trajectory planning for spray painting of free-form surfaces in automotive manufacturing", Proceedings/2002 IEEE International Conference on Robotics and Automation; May 11-15, 2002, Washington, D.C., IEEE Service Center, Piscataway, NJ, vol. 1, May 11, 2002, p. 450, XP032882428; DOI: 10.1109/Robot.2002.1013401, ISBN: 978-0-7803-7272-6, the whole document.

Lueth T C Ed—Institute of Electrical and Electronics Engineers: "Automated planning of robot workcell layouts", Proceedings of the International Conference on Robotics and Automation Nice, May 12-14, 2019; [Proceednegs of the International Conference on Robotics and Automation], Los Alamitos, IEEE Comp. Soc. Press, US, vol. CONF. 8, May 12, 1992, pp. 1103-1108, XP010027753, DOI: 10.1109/ROBOT.1992.220201, ISBN: 978-0-8186-2720-0, the whole document.

JPO Office Action dated Jun. 1, 2021 for Application No. JP2019513347 (12 pages; with English translation).

Qi, Ruolong et al.; "An Obstracle Avoidance Trajectory Plannung Scheme fo Space Manupulators Based on Genetic Algorithm"; Robot, vol. 36 No. 3, May 15, 2014, pp. 263,270 (17 Pages; with English machine translation).

CIPO Office Action dated Oct. 22, 2021 for Application No. 201780044752.X (17 pages; with English machine translation).

CIPO Search Report for Application No. 201780044752.X (2 pages).

* cited by examiner

OPTIMISATION METHOD FOR A COATING ROBOT AND CORRESPONDING COATING SYSTEM

CROSS-REFERENCE TO RELATED APPLICATIONS

This application is a national stage of, and claims priority to, Patent Cooperation Treaty Application No. PCT/EP2017/072087, filed on Sep. 4, 2017, which application claims priority to German Application No. DE 10 2016 010 945.9, filed on Sep. 9, 2016, which applications are hereby incorporated herein by reference in their entireties.

FIELD

The disclosure relates to an optimisation method for calculating an optimised movement path of a coating robot (e.g. painting robot) which guides an application device (e.g. rotary atomiser) over a component surface to be coated of a component (e.g. motor vehicle bodywork component). The disclosure also relates to a corresponding coating system.

BACKGROUND

In modern painting systems for painting motor vehicle bodywork parts, typically multi-axis painting robots 1 as illustrated, for example, in FIG. 1 are used. The painting robot 1 therefore has a robot base 2, a rotatable robot element 3, a proximal robot arm 4, a distal robot arm 5, a multiaxis robot hand axis 6 and a rotary atomiser 7, which is per se known from the prior art. The rotatable robot element 3 is rotatable herein about a vertically oriented first robot axis A1 relative to the robot base 2. The proximal robot arm 4 is rotatable relative to the rotatable robot element 3 about a second robot axis A2 oriented horizontally. The distal robot arm 5 is pivotable about a horizontally oriented third robot axis A3 relative to the proximal robot arm 4. It should also be mentioned that the robot hand axis 6 in this exemplary embodiment has three robot axes A4, A5 and A6 in order to enable a highly mobile guidance of the rotary atomiser 7. It should further be mentioned that the robot base 2 in this exemplary embodiment is movable along a linear axis along a robot axis A7.

During operation, the rotary atomiser 7 emits a spray jet of a paint onto the component to be coated, wherein the spray jet has a spray jet axis 8 which is oriented toward a programmed paint impact point TCP (Tool Centre Point).

It should also be mentioned that a linear colour changer 9 is arranged on the distal robot arm 5, which is per se known from the prior art and therefore need not be described further. In operation, the linear colour changer 9 is covered by a cover, although the cover is not shown in the drawing, in order to enable a view of the linear colour changer 9.

During operation, the painting robot 1 is moved so that the programmed paint impact point TCP follows a pre-determined robot path B over the component surface of the component to be painted (e.g. motor vehicle bodywork component). FIG. 2 shows in schematic form the robot path B which is defined by a plurality of points P1-P6, wherein the path points P1-P6 form waypoints for the robot path B. What is important herein is not only the spatial position of the individual path points P1-Pi, but also the orientation of the rotary atomiser 7 and thus also of the spray jet axis 8.

Before the actual coating operation, the robot path B is typically programmed offline, for which purpose, for example, programming programs can be used which are commercially available under the brand names ROBCAD®, Process Simulate™ and Fast®CURVE. Herein, additional information can also be input by the programmer, for example, a desired axis position at a particular path point. This can be advantageous in order to specify unambiguously, in a robot with redundancy, the robot configuration at a particular point. It should herein be mentioned that a robot with redundancy is a robot which can reach a desired path point with a desired orientation using infinitely many robot configurations, i.e. with infinitely many combinations of the axis positions of the robot axes A1-A7.

The known offline programming methods are very complex particularly with robots having redundancy since many information items have to be input manually. Furthermore, an adaptation of the robot path B is always required as soon as the position of the painting robot 1 is changed.

Finally also, no reproducible programming is possible since the quality of the programming is dependent on the experience and skill of the respective programmer.

A need has arisen to provide an improved optimization method for a coating robot and coating system.

DETAILED DESCRIPTION

The optimisation method according to the disclosure serves for calculating an optimised movement path of a coating robot, which guides an application device over a component surface to be coated.

In one example, the coating robot is a painting robot, as is known from the prior art and is described above. However, the disclosure is similarly also suitable for optimising the movement path of other types of coating robots which are utilized, for example, for the application of sealant material, damping material, adhesive or sealing material.

The optimisation method according to the disclosure is used in the painting of motor vehicle bodywork components. The disclosure is however similarly useful for the coating of other types of components.

In the scope of the optimisation method according to the disclosure, initially in accordance with the prior art, a movement path is provided wherein the desired movement path is defined by path points which serve as waypoints for the movement path.

Firstly, the path point data of the individual path points at least partially define the spatial position of a reference point (TCP: tool centre point) of the application device at the respective path point. Preferably, the reference point is the programmed paint impact point which lies at a particular spacing axially in front of the rotary atomiser.

Secondly, however, the path point data also at least partially define the respective spatial orientation of the application device at the respective path point.

Preferably, the stipulation of the spatial position and the spatial orientation of the application device at each path point is carried out completely and unambiguously, so that the spatial position and the spatial orientation of the application device (e.g. rotary atomiser) is clearly defined at every path point.

Figure 1:
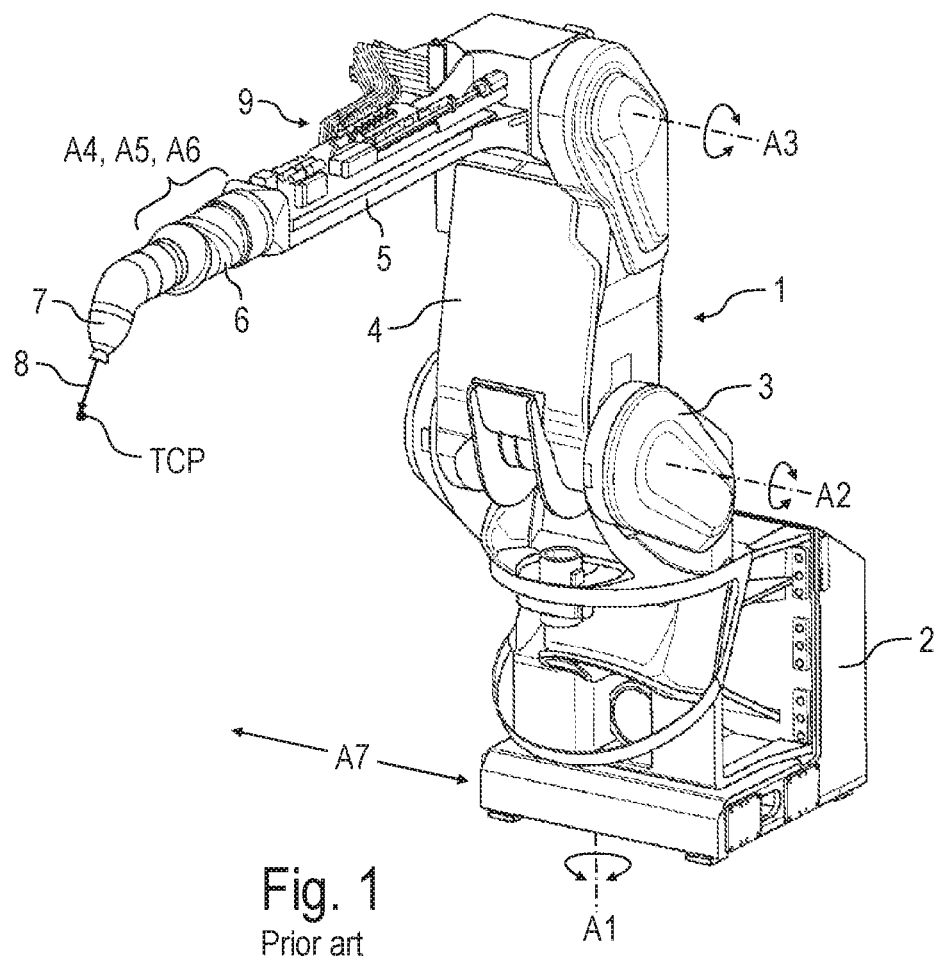
FIG. 1 shows a perspective view of a painting robot, as is per se known from the prior art.
Figure 2:
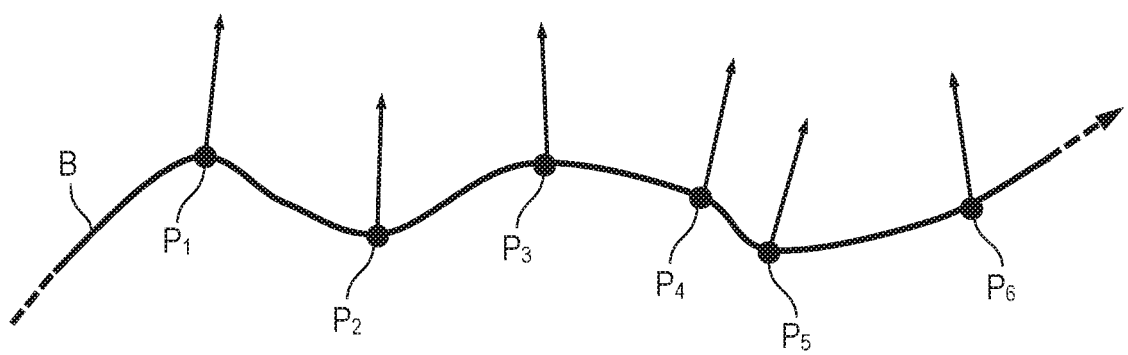
FIG. 2 shows a simplified representation of a robot path.

Furthermore, the optimisation method according to the disclosure corresponds to the prior art in that for each of the path points of the movement path, possible robot configurations are calculated. The term "robot configuration" used in the context of the disclosure comprises the totality of all the robot positions in the individual movable robot axes. In a 7-axis painting robot—as in FIG. 1—each robot configuration therefore consists of a 7-dimensional vector wherein the individual components of the vector specify the individual axis positions.

The term "robot axis" used in the context of the disclosure takes into account the degrees of freedom of movement of the robot. This can involve, for example, a linear movement or a rotation or pivoting movement.

It should herein be noted that a particular path point with a particular spatial position or a particular spatial orientation of the application device can be realized not only with a single robot configuration, but typically through infinitely many different robot configurations, since the robot typically has redundancy. This has the result that the different robot configurations are suited differently to the later realization of the robot path.

For example, it is conceivable that a particular robot configuration leads to a collision between the outer contour of the robot and spatial limitations (e.g. booth wall, outer contour of other robots) and is therefore not suitable.

Furthermore, it can arise that although a robot configuration does not lead to a collision with spatial limitations, it maintains only a small spacing from spatial limitations so that slight positional changes of the robot could possibly lead to a collision with spatial limitations.

Furthermore, the possibility exists that a particular robot configuration maintains a sufficiently large spacing from the spatial limitations, so that no collisions are to be feared. However, the possibility then exists that between the successive path points, extensive changes to the axis positions are required, which leads to severe robot movements and increases the required movement time between the successive path points.

The different technically possible robot configurations therefore differ with regard to their quality, wherein the quality can be represented by a quality value. The optimisation method according to the disclosure therefore provides that for each possible robot configuration, at the individual path points, a path point-related quality value is determined, so that the quality of the different possible robot configurations can be compared.

In the context of the optimisation method according to the disclosure, a selection of one of the possible robot configurations then takes place for the individual path points, dependent upon the path point-related quality value of the different possible robot configurations. Thus, as a rule, it is the robot configuration for the respective path point that has the best quality value which is selected.

It has already been mentioned that the different possible robot configurations can differ with regard to their spacing from the spatial limitations. The calculation of the path point-related quality value therefore also may include the definition of an interference contour surrounding the coating robot. For example, this interference contour can represent the outer contours of walls and a floor of a coating booth surrounding the coating robot. Furthermore, the interference contour can also represent adjacent coating robots. The possibility also exists that the interference contour represents the outer contour of adjacent handling robots. Finally, the interference contour can also represent the component to be coated or a conveyor which transports the component through the painting system. As a result, the interference contour therefore specifies the outer contours of spatial limitations in order to avoid a collision therewith. Furthermore, the outer contour of the coating robot is preferably also defined, which is possible, for example, by means of CAD (computer aided design) data of the coating robot. The calculation of the quality value for the individual robot configurations then preferably takes place dependent firstly upon the pre-defined interference contour and secondly upon the outer contour of the coating robot although naturally the desired spatial position and orientation of the coating robot is also taken into account.

For example, the path point-related quality value for the individual robot configurations can indicate whether a realization of the robot configuration leads to a collision with the interference contour. In this case, the quality value is binary since it only indicates whether a collision would take place or not.

In an example, the path point-related quality value indicates for the individual robot configurations the smallest spacing between the outer contour of, firstly, the coating robot and, secondly, the surrounding interference contour. In this case, the quality value is therefore a continuous value since the spacing is preferably calculated continuously.

Furthermore, the path point-related quality value can also indicate the manipulability of the robot in the respective path point. A low manipulability signifies that large axis movements are necessary in order to bring about a small movement at the TCP. This occurs, for example, at the edge of the working space or in the region of singularities. Robot configurations with low manipulability are, where possible, to be avoided.

It was briefly mentioned above that a particular robot configuration with regard to the preceding or subsequent robot configurations on the robot path can be unsuitable since, for example, extensive displacements of the robot between successive path points are necessary. It is therefore usually not satisfactory if the selection of the robot configuration takes place in isolation for each individual path point. Rather, it is useful if the selection of the optimum robot configurations from the possible robot configurations also takes place considering adjacent path points. In the context of the optimisation method according to the disclosure, it is therefore preferably provided that a plurality of different possible sequences of robot configurations are calculated, wherein the coating robot, on sequential performance of successive robot configurations, guides the application device with the respective pre-determined spatial position and the respectively pre-determined spatial orientation along the pre-determined movement path. A sequence-related quality value is then preferably calculated for the different possible sequences of robot configurations, so that each sequence is assigned respectively to a sequence-related quality value.

Subsequently, from the different possible sequences of robot configurations, a sequence is then selected, specifically dependent upon the sequence-related quality value. In this way, for example, it can also be achieved that the robot must be adjusted only slightly when travelling along the robot path, and with low accelerations.

Thus the sequence-related quality value preferably also comprises the required axis travel distances between the successive robot configurations of the sequence of robot configurations. The selection of the optimum sequence from the possible sequences of robot configurations then takes place such that the required axis travel distances between the successive robot configurations are minimised.

Furthermore, the sequence-related quality value can also represent the required axis velocities between the successive robot configurations of the sequence of robot configurations. The selection of the optimum sequence of robot configurations from the possible sequences then takes place such that the required axis velocities between the successive robot configurations are minimised.

Furthermore, the sequence-related quality value can also represent the required axis accelerations between the successive robot configurations of the sequence of robot configurations. The selection of the optimum sequence from the possible sequences then takes place such that the required axis accelerations between the successive robot configurations are minimised.

For example, the sequence-related quality value can also indicate which rotation of the application device is required between the path points in a sequence.

It should herein be mentioned that the path point data of the individual path points defines the spatial orientation of the application device with regard to the orientation of its spray axis, and with regard to the rotation of the application device about the spray axis. This is possible since the spray jet of a rotary atomiser is rotationally symmetrical so that the rotation angle of the application device in relation to its spray jet axis does not have to be defined.

Alternatively, the possibility exists that the path point data of the individual path points define the spatial orientation of the application device both with regard to the orientation of its spray axis, as well as with regard to the rotation of the application device about the spray axis. This is useful if the application device emits a spray jet which is not rotationally symmetrical with regard to its spray jet axis.

It should further be mentioned that in the context of the optimisation method, is is possible that just the robot configurations for the forthcoming path points are optimised on the pre-determined movement path. The already optimised robot configurations of the preceding path points, however, are preferably no longer optimised, but only made the basis of the calculation of the sequence-related quality value. The optimisation method therefore usually proceeds along the individual path points in sequence and sequentially optimises the robot configuration for each path point.

Figure 3:
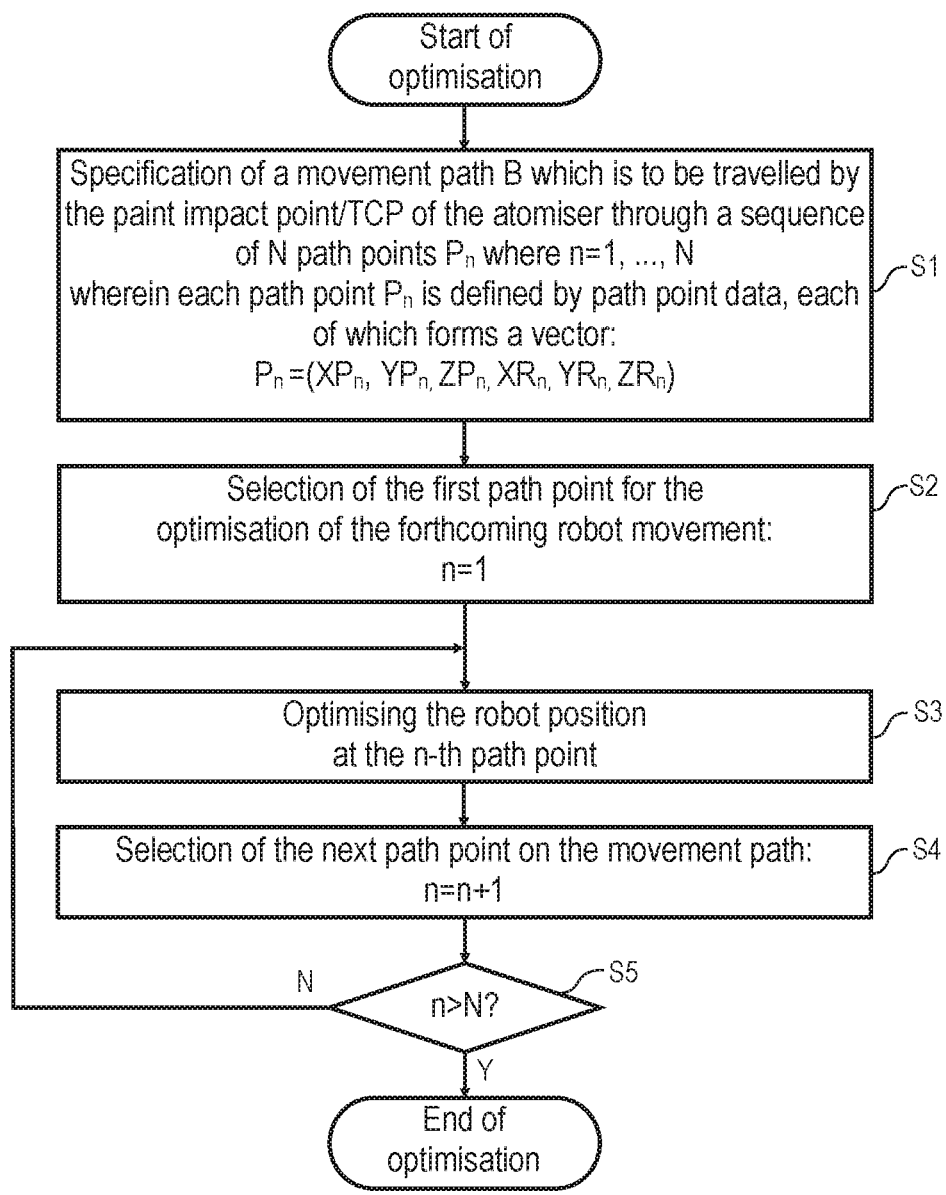
FIG. 3 shows a flow diagram to elucidate the optimisation method according to the disclosure.

With reference to FIG. 3, in a first step S1, firstly the movement path B which is to be followed by the paint impact point TCP of the rotary atomiser 7 is defined. Each of the path points $P_n$ is herein defined by path point data, in each case forming a vector as follows:

$$P_n=(XP_n, YP_n, ZP_n, XR_n, YR_n, ZR_n)$$

The components $XP_n$, $YP_n$, $ZP_n$ of this vector herein define the spatial position of the respective path point $P_n$. The components $XR_n$, $YR_n$, $ZR_n$, however, define the respective orientation of the rotary atomiser 7 and the spray jet axis 8 at the respective path point $P_n$.

In a next step S2, firstly the first path point P1 is then selected for the optimisation of the forthcoming robot movement.

Then, in a next step S3, in a loop, the robot position (robot configuration) is optimised at the n-th path point, and this will be described in detail.

Then, in the next step S4, in the loop, the next path point on the movement path is selected.

In a subsequent step S5, it is checked whether all the path points have been optimised. If this is the case, then the optimisation method is complete.

The optimisation of the robot position (robot configuration) in step S3 will now be described in greater detail making reference to FIG. 3. The individual method steps in step S3 are represented in the flow chart of FIG. 4.

In a first step S3.1, initially M possible robot configurations $RK_{n,m}$ for the respective n-th path point $P_n$ are calculated. The individual robot configurations $RK_{n,m}$ herein comprise all the axis positions a1, . . . , a7 of the robot axes A1-A7 at the respective path point $P_n$ and form a vector as follows:

$$RK_{n,m}=(a1, \ldots, a7)$$

Then, in a subsequent step S3.2, for each of the M possible robot configurations $RK_{n,m}$, a respective path point-related quality value $PQ_{n,m}$ is calculated.

Subsequently, in step 3.3, M possible sequences $S_{n,m}$ for the n-th path point $P_n$ are calculated, wherein each sequence places a possible robot configuration $RK_{n,m}$ in relation to the previous already optimised robot configuration or to the subsequent still to be optimised robot configurations, so that the robot dynamics resulting therefrom can be calculated.

In a subsequent step S3.4, for each of the possible sequences $S_{n,m}$ a sequence-related quality value $SQ_{n,m}$ is then calculated.

Then, in a last step S3.5, an optimal robot configuration $RK_{n,OPT}$ is selected for the respective path point, specifically dependent upon the path-related quality values $PQ_{n,m}$ and dependent upon the sequence-related quality values $SQ_{n,m}$.

Figure 4:
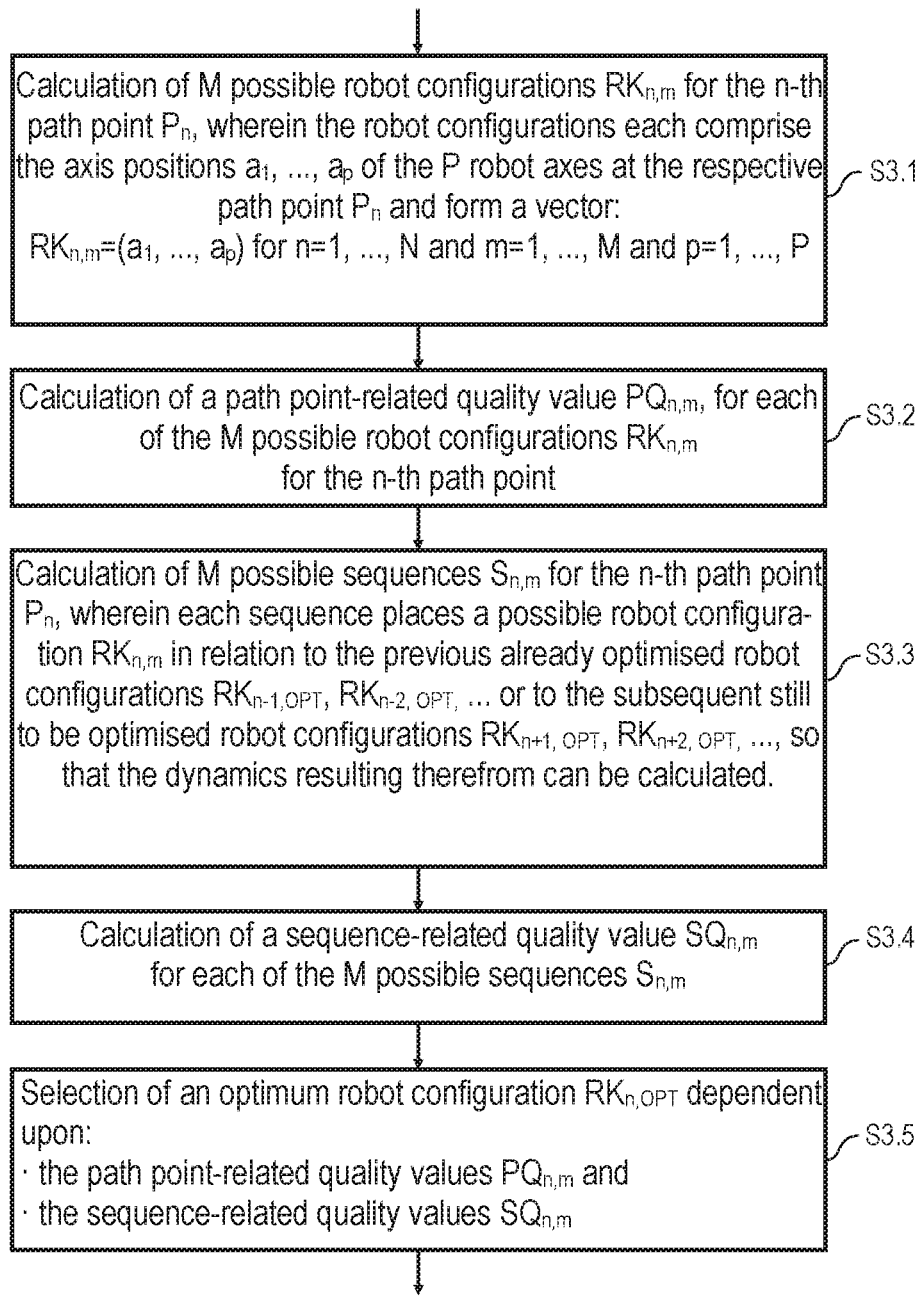
FIG. 4 shows a flow diagram to elucidate the optimisation method according to step S3 in FIG. 3.
Figure 5:
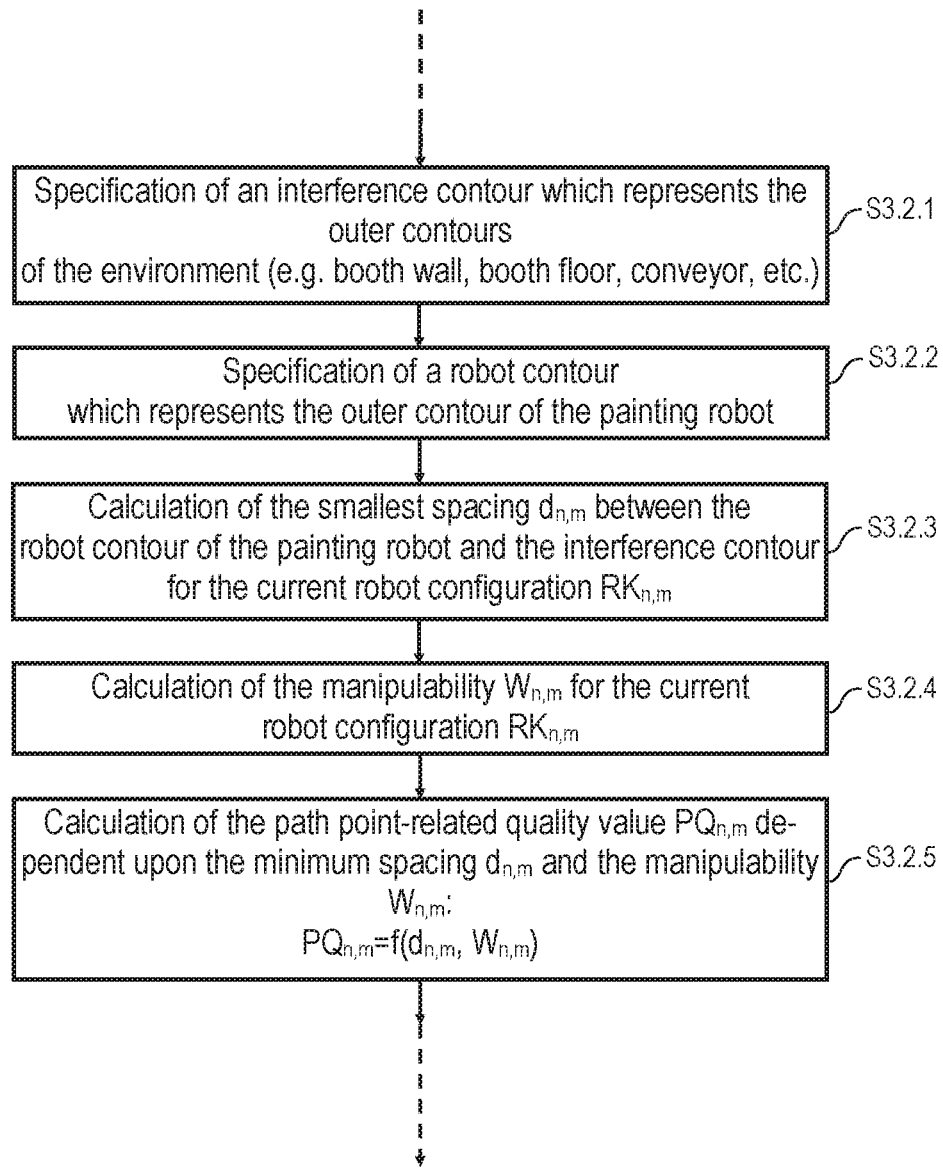
FIG. 5 shows a flow diagram to elucidate the step S3.2 in FIG. 4

In the flow chart of FIG. 5, the calculation of the path point-related quality value $PQ_{n,m}$ according to step 3.2 in FIG. 4 is represented in greater detail.

In a first step S3.2.1, firstly, an interference contour is specified, the interference contour representing the outer contours of the environment (e.g. booth wall, booth floor, conveyor, etc.) in order to be able to prevent collisions.

Furthermore, in a step S3.2.2, a robot contour is specified which represents the outer contour of the painting robot 1, which is also important for preventing collisions.

In a step S3.2.3, the smallest spacing $d_{n,m}$ between the robot contour of the painting robot 1 and the interference contour for the current robot configuration $RK_{n,m}$ is then calculated.

Furthermore, in a step S3.2.4, the manipulability $W_{n,m}$ is calculated for the current robot configuration $RK_{n,m}$.

In a step S3.2.5, a path point-related quality value $PQ_{n,m}$ is then calculated, specifically dependent upon the minimum spacing $d_{n,m}$ relative to the interference contour and dependent upon the manipulability $W_{n,m}$ according to the following formula:

$$PQ_{n,m}=f(d_{n,m}, W_{n,m})$$

Figure 6:
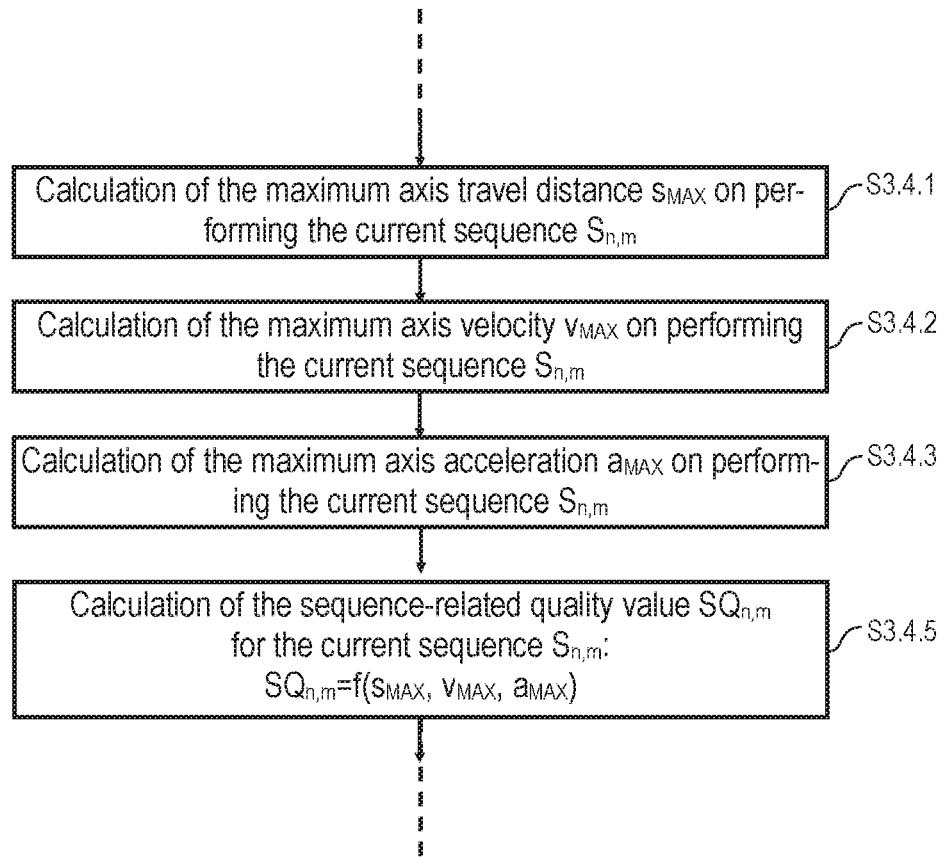
FIG. 6 shows a flow diagram to elucidate the step S3.4 in FIG. 4.

FIG. 6 shows the individual steps that are followed in the method step S3.4 of FIG. 4 in order to calculate the sequence-related quality value $SQ_{n,m}$.

In a first step S3.4.1, the maximum axis travel distance $s_{MAX}$ which the robot axes must cover on passing through the current sequence $S_{n,m}$ is calculated.

In a step S3.4.2, the maximum axis velocity $v_{MAX}$ on passing through the current sequence $S_{n,m}$ is then calculated.

In a step S3.4.3, the maximum axis acceleration $a_{MAX}$ reached on passing through the current sequence $S_{n,m}$ is then calculated.

From these values, in a step S3.4.5, a sequence-related quality value $SQ_{n,m}$ for the current sequence $S_{n,m}$ is then calculated, specifically according to the following formula:

$$SQ_{n,m}=f(s_{MAX}, v_{MAX}, a_{MAX}). \qquad 5$$

Figure 7:
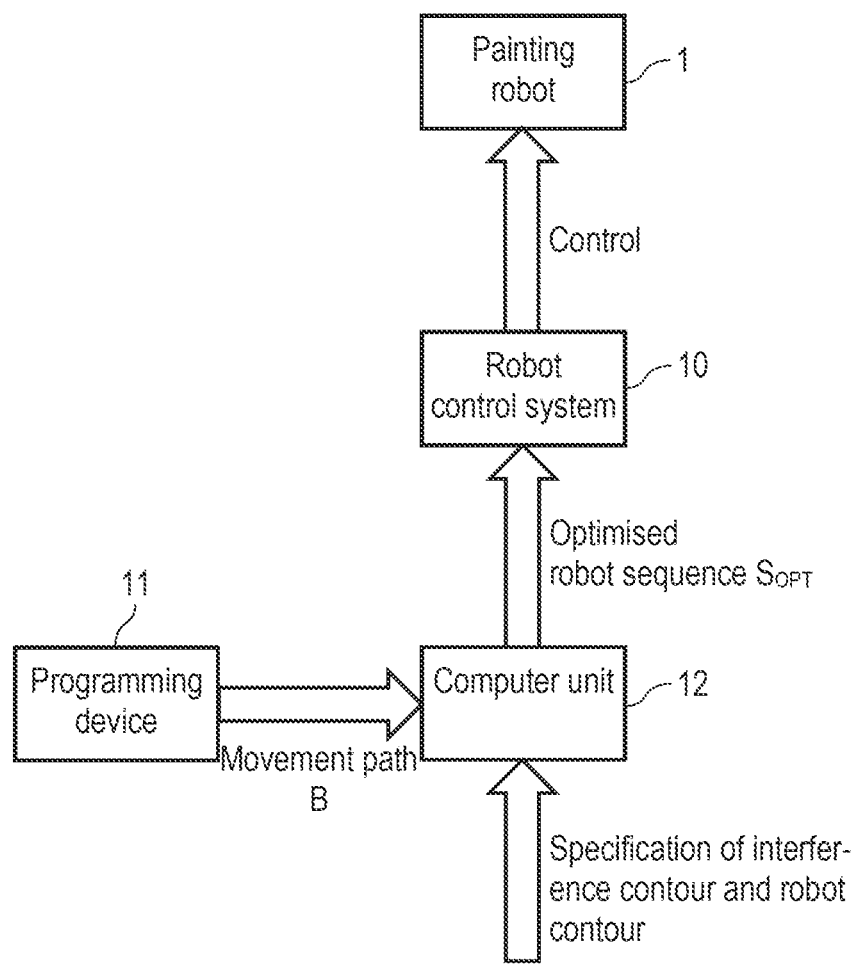
FIG. 7 shows a schematic of a painting system.

FIG. 7 shows a simplified schematic representation of a painting system according to the disclosure which can carry out the above-described optimisation method according to the disclosure.

Thus the painting system comprises, aside from the above described painting robot 1, a robot control system 10 and a programming device 11, this construction being known from the prior art and therefore need not be described further.

By means of the programming device 11, the desired movement path B of the robot is specified. The painting system according to the disclosure however also comprises a computer unit 12 which carries out the optimisation method according to the disclosure and from the pre-defined movement path B calculates an optimised robot sequence $S_{OPT}$, as described above. Herein, the computer unit 12 takes into account a pre-defined interference contour and the outer contour of the painting robot 1.

It should be mentioned herein that the computer unit 12 can be realised optionally as separate hardware components or as software, wherein the software can also be integrated, for example, into the robot control system 10.

The disclosure is not restricted to the above-described exemplary embodiment. Rather a plurality of variants and derivations are possible which also make use of the disclosed concept and therefore fall within the protective scope.

The invention claimed is:

1. An optimisation method for calculating an optimised movement path of a coating robot which guides an application device over a component surface to be coated, comprising:
   a) defining successive path points of the movement path through path point data, wherein the path point data for each path point at least partially defines a spatial position of a reference point of the application device at the respective path point, and at least partially defines a spatial orientation of the application device at the respective path point, and
   b) calculating possible robot configurations for the individual path points of the movement path, wherein each robot configuration includes all axis positions of all the robot axes and at least some of the path points are respectively optionally achievable through a plurality of different robot configurations,
   c) calculating a path point-related quality value respectively individually for the different possible robot configurations of the individual path points, so that a quality value is assigned to each robot configuration, wherein the calculation of the path point-related quality value further comprises defining an interference contour surrounding the coating robot, defining an outer contour of the coating robot, and calculating the quality value for the individual robot configurations dependent upon the interference contour and dependent upon the outer contour of the coating robot, and
   d) selecting one of the possible robot configurations for the individual path points dependent upon the path point-related quality value of the different possible robot configurations.

2. The optimisation method according to claim 1, wherein the path point-related quality value for the individual robot configurations indicates at least one of the following:
   a) whether a realisation of the robot configuration leads to a collision with the interference contour,
   b) a smallest spacing between, firstly, the outer contour of the coating robot and, secondly, the interference contour.

3. The optimisation method according to claim 2, wherein the interference contour represents outer contours of the following objects:
   a1) walls and floor of a coating booth surrounding the coating robot,
   a2) adjacent coating robots,
   a3) adjacent handling robots,
   a4) the component to be coated.

4. The optimisation method according to claim 1, wherein
   a) the path point-related quality value represents manipulability of the coating robot at the respective path point, and
   b) the manipulability indicates an extent to which the coating robot can assume the different robot configurations at the path point, so that the manipulability at a singular robot position is zero.

5. The optimisation method according to claim 1, further comprising the following steps:
   a) calculating different possible sequences of the robot configurations, wherein the coating robot, on sequential performance of the sequence of the robot configurations, guides the application device with the respective pre-determined spatial position and the respective pre-determined spatial orientation along the pre-determined movement path,
   b) calculating a sequence-related quality value for the different possible sequences of robot configurations, so that a sequence-related quality value is assigned to each sequence, and
   c) selecting one of the different possible sequences of robot configurations dependent upon the sequence-related quality value.

6. The optimisation method according to claim 5, wherein
   a) the sequence-related quality value represents required axis travel distances between the successive robot configurations of the sequence of the robot configurations, and
   b) the selection of one of the possible sequences of the robot configurations takes place such that the required axis travel distances between the successive robot configurations are minimised.

7. The optimisation method according to claim 5, wherein
   a) the sequence-related quality value represents required axis velocities between the successive robot configurations of the sequence of the robot configurations, and
   b) the selection of one of the possible sequences of the robot configurations takes place such that the required axis velocities between the successive robot configurations are minimised.

8. The optimisation method as claimed in claim 5, wherein
   a) the sequence-related quality value represents required axis accelerations between the successive robot configurations of the sequence of the robot configurations, and
   b) the selection of one of the possible sequences of the robot configurations takes place such that the required axis accelerations between the successive robot configurations are minimised.

9. The optimisation method according to claim 5, wherein the sequence-related quality value indicates which rotation of the application device is required between the path points in a sequence.

10. The optimisation method according to claim 1, wherein the path point data of the individual path points define the spatial orientation of the application device only with regard to an orientation of its spray axis, but not with regard to a rotation of the application device about the spray axis.

11. The optimisation method according to claim 1, wherein the path point data of the individual path points define the spatial orientation of the application device both with regard to an orientation of its spray axis as well as with regard to a rotation of the application device about the spray axis.

12. The optimisation method according to claim 1, wherein
   a) only the robot configurations for the forthcoming path points are optimised on the pre-determined movement path, and
   b) the already optimised robot configurations of the preceding path points can no longer be optimised, but only made a basis for calculating a sequence-related quality value.

13. An optimisation method for calculating an optimised movement path of a coating robot which guides an application device over a component surface to be coated, comprising:
   a) defining successive path points of the movement path through path point data, wherein the path point data for each path point at least partially defines a spatial position of a reference point of the application device at the respective path point, and at least partially defines a spatial orientation of the application device at the respective path point, and
   b) calculating possible robot configurations for the individual path points of the movement path, wherein each robot configuration includes all axis positions of all the robot axes and at least some of the path points are respectively optionally achievable through a plurality of different robot configurations,
   c) calculating a path point-related quality value respectively individually for the different possible robot configurations of the individual path points, so that a quality value is assigned to each robot configuration,
   d) selecting one of the possible robot configurations for the individual path points dependent upon the path point-related quality value of the different possible robot configurations,
   e) calculating different possible sequences of the robot configurations, wherein the coating robot, on sequential performance of the sequence of the robot configurations, guides the application device with the respective pre-determined spatial position and the respective pre-determined spatial orientation along the pre-determined movement path,
   f) calculating a sequence-related quality value for the different possible sequences of robot configurations, so that a sequence-related quality value is assigned to each sequence, wherein the sequence-related quality value represents required axis velocities between the successive robot configurations of the sequence of the robot configurations, and
   g) selecting one of the different possible sequences of robot configurations dependent upon the sequence-related quality value, wherein the selection of one of the possible sequences of the robot configurations takes place such that the required axis velocities between the successive robot configurations are minimised.

14. An optimisation method for calculating an optimised movement path of a coating robot which guides an application device over a component surface to be coated, comprising:
   a) defining successive path points of the movement path through path point data, wherein the path point data for each path point at least partially defines a spatial position of a reference point of the application device at the respective path point, and at least partially defines a spatial orientation of the application device at the respective path point, and
   b) calculating possible robot configurations for the individual path points of the movement path, wherein each robot configuration includes all axis positions of all the robot axes and at least some of the path points are respectively optionally achievable through a plurality of different robot configurations,
   c) calculating a path point-related quality value respectively individually for the different possible robot configurations of the individual path points, so that a quality value is assigned to each robot configuration,
   d) selecting one of the possible robot configurations for the individual path points dependent upon the path point-related quality value of the different possible robot configurations,
   e) calculating different possible sequences of the robot configurations, wherein the coating robot, on sequential performance of the sequence of the robot configurations, guides the application device with the respective pre-determined spatial position and the respective pre-determined spatial orientation along the pre-determined movement path,
   f) calculating a sequence-related quality value for the different possible sequences of robot configurations, so that a sequence-related quality value is assigned to each sequence, wherein the sequence-related quality value represents required axis accelerations between the successive robot configurations of the sequence of the robot configurations, and
   g) selecting one of the different possible sequences of robot configurations dependent upon the sequence-related quality value, wherein the selection of one of the possible sequences of the robot configurations takes place such that the required axis accelerations between the successive robot configurations are minimised.

* * * * *